UNITED STATES PATENT OFFICE.

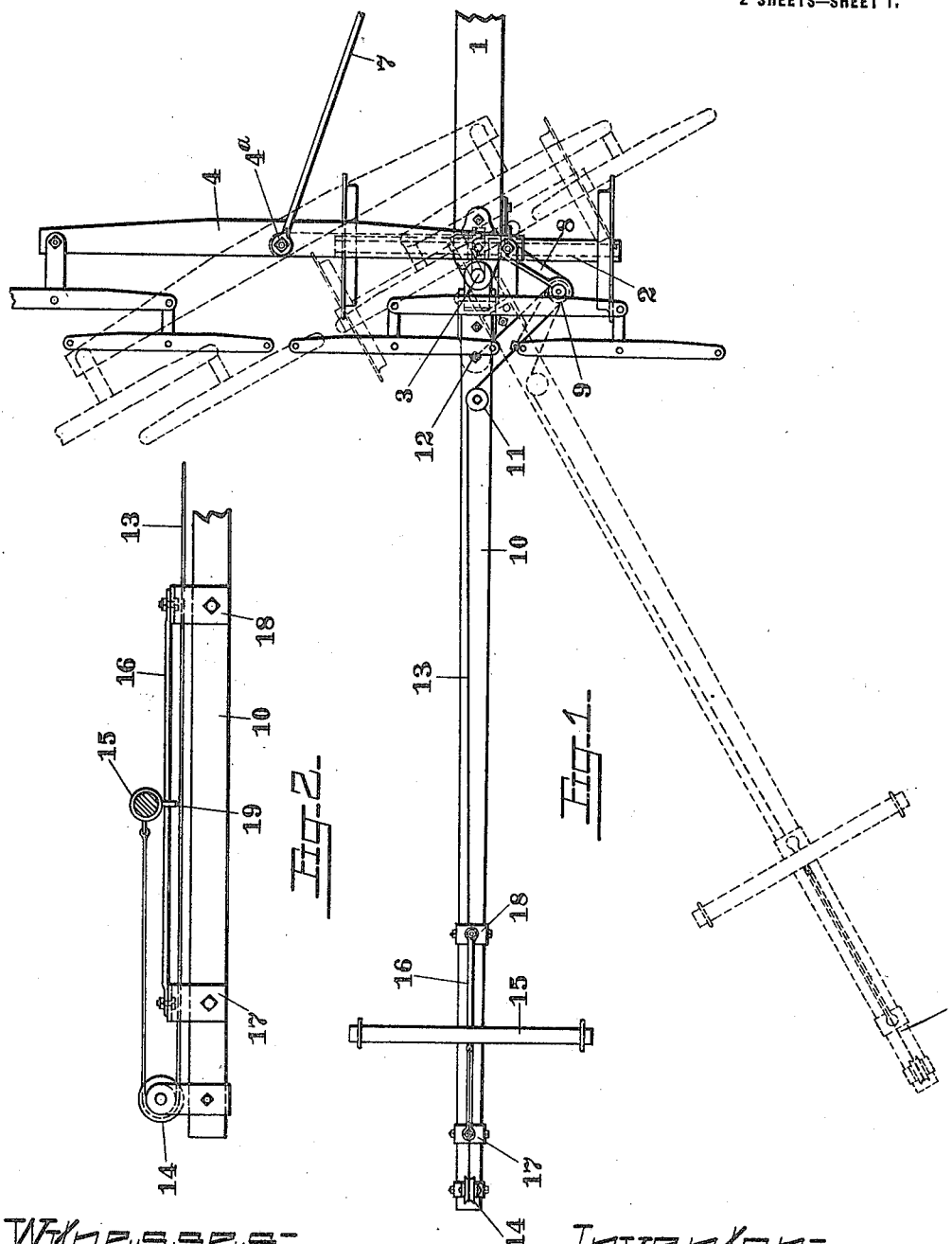

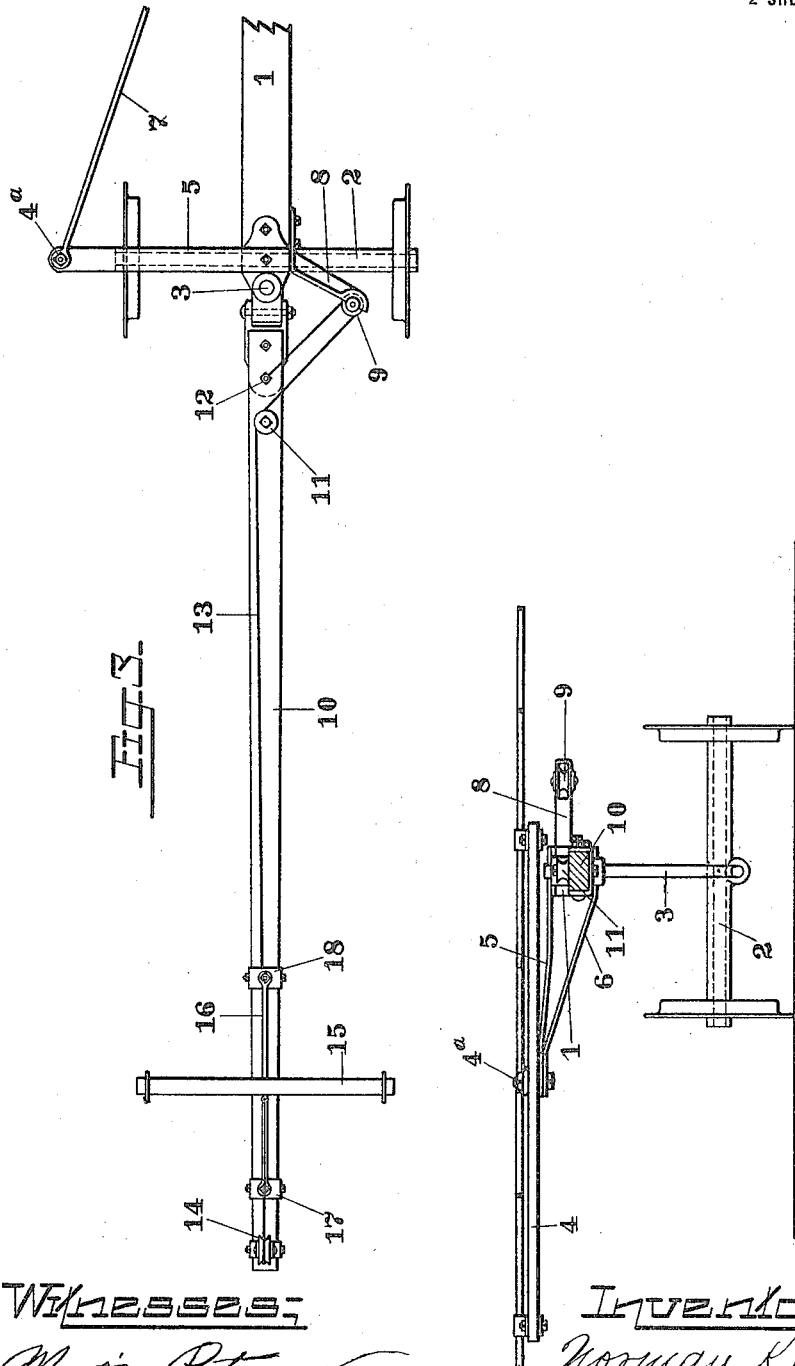

NORMAN K. OLMSTED, OF MOLINE, ILLINOIS, ASSIGNOR TO DEERE & COMPANY, OF MOLINE, ILLINOIS, A CORPORATION OF ILLINOIS.

DRAFT DEVICE.

1,141,259.        Specification of Letters Patent.        Patented June 1, 1915.

Application filed August 6, 1913. Serial No. 783,401.

*To all whom it may concern:*

Be it known that I, NORMAN K. OLMSTED, a citizen of the United States, residing at Moline, in the county of Rock Island and State of Illinois, have invented certain new and useful Improvements in Draft Devices, of which the following is a specification, reference being had therein to the accompanying drawing.

My invention relates to draft mechanism particularly as applied to agricultural machinery, and my object is to preserve the uniformity of the draft whether it be directly ahead or employed in making a turn.

Referring to the drawings in which similar numerals indicate identical parts Figure 1 is a plan view of my invention as applied to a harvester. Fig. 2 is an enlarged side elevation of the forward end of the pole showing the part of my invention mounted thereon. Fig. 3 is a plan view with the draft appliances omitted, and Fig. 4 is a front elevation in part section of Fig. 3.

A stub tongue 1, shown in part only, is ordinarily attached to the front of a machine or implement usually utilized in agricultural operations. The forward part of the stub tongue is pivotally supported on a truck 2 by a standard 3. An equalizer, comprising an equalizer bar 4 carrying doubletrees, is pivotally supported at 4ª on bracket arms 5 and 6 secured on the stub tongue 1 and extended laterally; a brace rod 7 connects with the pivot of the equalizer and extends rearwardly when it is ordinarily attached to the machine or implement to be drawn.

An arm 8 is secured to the stub tongue 1 and carries a pulley 9; a pole 10 is pivotally connected to the stub tongue 1 and has mounted thereon a pulley 11. Secured preferably to a bolt 12 is one end of cable 13 which passes around the pulley 9 and the pulley 11 and leads forward and over a vertically disposed pulley 14 mounted on the forward end of the pole 10 to a neck yoke 15; a rod 16 is secured to supports 17 and 18 which are mounted on the pole 10 and which project sufficiently thereabove clear of the pole 10 to permit passage of the cable 13; the rod 16 passes through an eye 19 on the neck yoke 15, the rod 16 acting as a guide for the forward and backward movement of the neck yoke 15.

In a draft mechanism of the class shown and described in which the pole and equalizer are pivoted at different points, but in which no provision is made for maintaining the same distance between the neck yoke and double-equalizer during any lateral movement of the pole, a heavy strain is brought upon the harness when the pole is turned, as shown in dotted lines in Fig. 1, because of the increase in the distance between the neck yoke and equalizer, and if the pole is turned in the opposite direction the distance between the neck yoke and equalizer bar will be decreased, crowding the horses against the latter and materially interfering with a proper guidance of the machine to which the draft mechanism is attached.

In the operation of my device, in which the pole 10 and truck 2 are properly connected to turn simultaneously to right or left, the normal position of the parts when the draft is directly ahead is shown in full lines in Fig. 1. When the turn is made in the direction shown by dotted lines, the equalizer turns on its pivot 4ª, and as the position of the horses is constant to both the equalizer 4 and neck yoke 15, it follows that the latter must move longitudinally of the pole 10 to maintain a set distance from the pivotal point 4ª of the equalizer 4 and to preserve the proper position of the horses with relation to the neck yoke 15 and equalizer. As the pole turns on its pivot, as shown in Fig. 1, it approaches the arm 8, and recedes from the pivotal point 4ª, which ordinarily would slacken the cable 13, but the neck yoke 15, traveling freely and rearwardly on the rod 16 takes up the slack, the cable moving over the pulley 9 on the arm 8 and the pulleys 11 and 14 on the pole 10. If, however, the turn is made in the direction opposite to that shown in dotted lines in Fig. 1, the pole 10 will approach the pivotal point 4ª and recede from the arm 8, and the cable 13 having its rearward end secured to the pole will be drawn rearwardly over the pulley 9 on the arm 8 and pulleys 11 and 14 on the pole 10, and having its forward end attached to the neck yoke 15 the latter will be drawn forwardly on the rod 16, maintaining a set distance between the pivot point 4ª and the neck yoke. It is apparent that a set distance between the neck yoke 15 and the pivot point 4ª being secured, it is maintained by proportioning the speed of movement of the neck yoke and the pole 10 in relation to each other, whether the turn be toward or from the arm 8.

I do not confine myself to the arrangement of the parts shown, as it is obvious similar results can be secured by changing the arm 8 and the equalizer support to the opposite sides of the stub tongue 1 respectively.

What I claim is—

1. In a draft mechanism, the combination of a stub tongue, a pole pivotally connected to the stub tongue to swing laterally, an equalizer pivotally supported on the stub tongue, a neck yoke on the pole, and means on the stub tongue and pole and connected with the neck yoke to maintain substantially constant the distance of the latter from the equalizer when the pole is moved.

2. In a draft mechanism, the combination of a stub tongue having a support, a pole pivotally connected to the stub tongue to swing laterally, an equalizer pivotally mounted on a support on the stub tongue, a neck yoke on the pole, and means on the stub tongue and pole and connected to the neck yoke to maintain substantially constant the distance of the latter from the equalizer when the pole is moved.

3. In a draft mechanism, the combination of a stub tongue having a support, a pole pivotally connected to the stub tongue to swing laterally, an equalizer pivotally mounted on a laterally extended support on the stub tongue, a neck yoke on the pole, and means on the stub tongue and pole and connected to the neck yoke to maintain substantially constant the distance of the latter from the equalizer when the pole is moved.

4. In a draft device, the combination of a stub tongue having a support, a pole pivotally connected to the stub tongue to swing laterally, an equalizer pivotally mounted on a laterally extended support on the stub tongue, a neck yoke on the pole, and means on the stub tongue and pole and connected to the neck yoke to move the latter forwardly when the pole is turned in one direction.

5. In a draft device, the combination of a stub tongue having a support, a pole pivotally connected to the stub tongue to swing laterally, an equalizer pivotally mounted on a support on the stub tongue, a neck yoke slidably mounted on the pole and adapted to move forwardly when the pole is turned in one direction and rearwardly when the pole is turned in the opposite direction, and means on the stub tongue and pole and connected to the neck yoke to maintain substantially constant the distance of the latter from the equalizer when the pole is turned.

6. In a draft device, the combination of a stub tongue having a support, a pole pivotally connected to the stub tongue to swing laterally, an equalizer pivotally mounted on a support extending laterally from one side of the stub tongue, an arm mounted on the opposite side of said stub tongue and laterally extended therefrom, a pulley on said arm, a pulley on the pole, a pulley on the forward portion of the pole, a neck yoke slidably mounted on the pole, and a cable connected rearwardly to the pole and forwardly to the neck yoke and adapted to travel over said pulleys to maintain substantially constant the distance of the neck yoke from the equalizer.

In testimony whereof I affix my signature, in presence of two witnesses.

NORMAN K. OLMSTED.

Witnesses:
MARTIN PETERSON,
W. G. DUFFIELD.

Copies of this patent may be obtained for five cents each, by addressing the "Commissioner of Patents, Washington, D. C."